Patented Apr. 15, 1941

2,238,307

UNITED STATES PATENT OFFICE 2,238,307

THERMOPLASTIC PROTEIN MATERIAL

George H. Brother, Urbana, and Leonard L. McKinney, Champaign, Ill., assignors to Secretary of Agriculture of the United States of America No Drawing. Application January 28, 1938, Serial No. 187,572

6 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

The object of our invention is the production of a thermoplastic material derived from protein and a hardening agent.

Another object of our invention is the production of a thermoplastic hardened protein material capable of being molded without the use of water as a plasticizer.

The foregoing objects are accomplished according to our present invention by treating the protein material, such as soybean protein and meal, cottonseed meal or protein, linseed meal or protein, zein, gluten, other vegetable protein material or casein from milk with an aldehyde or similar hardening agent, for the period of time and under conditions necessary to produce and carry to completion the hardening, curing, or tanning reaction.

A protein in which the molecular structure tends towards spherical rather than towards linear chains or fibers is called a globular protein. X-ray diffraction patterns of globular proteins show amorphous rather than either fibrous or crystalline orientation.

The molding industry has long been searching for a satisfactory thermoplastic molding resin, especially one made with a protein base. The comparatively good strength, transparency, and possible color range of protein plastics, together with the ready availability of the protein at a comparatively low cost, has made this material interesting to the plastics industry for many years. However, up to the present time it has been seriously handicapped by the fact that water has been considered essential for plasticization. This has made the development of a protein resinous molding product practically impossible.

By definition we hold the term "protein resinous molding product" to mean a molding resin derived directly from the protein rather than a mixture of protein with other resinous materials where the function of the protein is largely that of a filler.

The only industrially important protein plastic up to this time is casein plastic. This product sold under numerous trade names, such as galalith, aladdinite, ameroid, gala, etc., is made by plasticizing casein with 25-40 percent water, forming into shape desired by heat and pressure and hardening in formaldehyde solution. The finished hardened product is not thermoplastic to any degree. The unhardened plastic contains excess water, which after forming and hardening has to be expelled, causing shrinking and warping. Molded products from such material are rather impractical, although attempts to develop them are to be found. (Kasen, U. S. Patent No. 2,045,471; Van Koch, U. S. Patent No. 2,051,779.)

In previous attempts to produce a protein molding product, four general lines were followed: First, to take advantage of the glutenizing action of alkali or acid on protein. Second, to incorporate with the water-plasticized protein an inactive or slow acting hardening agent, to be activated or speeded up by the heat of pressing, so that the hardening of the protein would take place in the press after the piece had formed to shape, or shortly after the piece had been removed from the press. Third, to incorporate or dissolve in the hardening agent other materials, which in themselves are water resistant, to increase the water resistance of the final product. These agents may have been added to the protein before the hardening material. Fourth, to mix with the protein other resin-producing material, or synthetic or natural resins.

The work of Satow (U. S. Patent Nos. 1,245,975; 1,245,976; 1,245,978; 1,245,979; 1,245,983; 1,245,984) demonstrates the first, i. e., plastics from protein glutenized by a strong alkali and/or acid at either a high or low pH, with or without the addition of formaldehyde, and with at least normal water present, in this case probably 12-15 percent. It is well known to those skilled in the art that formaldehyde does not harden protein in strong alkaline and/or strong acid systems, as it does in neutral or slightly acid, so his protein plastics, with or without formaldehyde, would be gummy while wet, glassy and brittle when dry, and could have little practical value or application.

Our invention differs from the teachings of Satow, above set forth, in that we do not glutenize the protein, preferring to work with it between pH 7 and the isoelectric point of the protein, for the reason we have found that in this range the hardening action of the formaldehyde produces a thermoplastic material. Furthermore, Satow's teachings are not directed to the making of a thermoplastic material, which is the essential product of our invention.

The usual agents incorporated into the water-plasticized protein to be activated by the heat of pressing are condensation products of formaldehyde, hexamethylenetetramine (Bartels, French Patent No. 420,543: Bartels and Miech, U. S. Patent No. 1,560,368), trioxymethylene (Morin, French Patent No. 388,441.) Also glyoxal (Ernst and Spousel, U. S. Patent No. 1,841,797) has been mentioned as have certain pentosans (Sloane, U. S. Patent No. 1,468,331.) None of these has proved industrially successful, because of the fact that the hardening agent cannot react uniformly on the material, and heterogeniety makes for a weak product. (Sturken, U. S. Patent No. 2,053,850.)

Although he claims a "plastic compound" produced by "condensing a protein with a substantially anhydrous aldehyde," Hull (U. S. Patent No. 1,648,179) shows in the body of his patent and also in declaration of objectives that he had no thought of producing a thermoplastic material. He states "The reaction between formaldehyde and protein is so rapid that there has never been enough time to mold articles of this type when the formaldehyde was compounded with the other ingredients," then selects furfural and mentions no other hardening agent, to conform with his objective of producing a "proteid-aldehyde mixture containing all the necessary ingredients so that condensation will take place slowly enough to permit articles to be molded therefrom before complete reaction takes place." To increase water resistance he dissolves oil, gums, etc., in the furfural, before adding to the protein (also U. S. Patent No. 1,711,025 and Snell, U. S. Patent No. 1,678,713). These have proved unsatisfactory, probably because the added oil, gum, etc., has so protected the protein before hardening, the furfural has no chance to function. In our invention, however, the protein being hardened can be mixed with these, or other agents.

A great many mixtures of protein and synthetic resins or of protein and the reacting ingredients for synthetic resins have been proposed. Only a few will be given as typical. (1) Phenol-formaldehyde: Allgemeine Elect. Ges., Brit. 445,839; Goldsmith, U. S. 965,137 and U. S. 1,076,417; Satow, U. S. 1,245,980; Sturken, U. S. 2,053,850; Hausen, U. S. 2,047,961; Fuhrmann, U. S. 2,006,736. (2) Urea-formaldehyde: Redman, U. S. 1,732,533; Ellis, U. S. 2,075,276; Landecker, U. S. 2,090,452. (3) Glyptal resins: Holt, U. S. 1,978,533. Many of these probably produce good results and one at least is industrially important (see Chase, British Plastics and Moulded Products Trader, Apr., 1936, p. 516), but in all of these the function of the protein matter is primarily that of filler, the synthetic resin being essentially the binder.

In order to illustrate our invention, the following specific examples are set forth, parts being given by weight:

Example 1.—100 parts of soybean protein were thoroughly mixed with a solution of 300 parts 37 percent formaldehyde, 0.4 part sodium hydroxide and allowed to stand for 20 hours at room temperature. The excess solution was then removed and the product air dried at 70° C. The dried protein-formaldehyde was ground in a ball mill for 24 hours. The resulting powder is a protein-aldehyde, thermoplastic molding material that may be molded to shape in the usual means by one skilled in the art.

Example 2.—A mixture is made of the following ingredients, compounded as described in Example 1.

| | Parts |
|---|---|
| Lactic acid casein | 100 |
| Formaldehyde (30%) | 250 |
| Sodium hydroxide | 0.4 |

Example 3.—A mixture is made of the following ingredients, compounded as described in Example 1.

| | Parts |
|---|---|
| Soybean protein | 100 |
| Crotonaldehyde | 180 |
| Water | 20 |
| Sodium hydroxide | 0.4 |

The molding powder and plastic were colored a dark brown.

Example 4.—A mixture is made of the following ingredients, compounded as described in Example 1.

| | Parts |
|---|---|
| Soybean protein | 100 |
| Acetaldehyde | 100 |
| Water | 100 |
| Sodium hydroxide | 0.4 |

The molding powder and plastic were colored dark brown, but lighter than the product in Example 3.

Example 5.—A mixture of the following ingredients, compounded as described in Example 1.

| | Parts |
|---|---|
| Soybean protein | 100 |
| Formaldehyde (37%) | 40 |
| Water | 260 |
| Sodium hydroxide | 0.4 |

The plastic did not flow as readily as the one in Example 1, but was quite thermoplastic and gave a plastic somewhat harder and tougher than the first.

Example 6.—A mixture is made of the following ingredients, compounded as described in Example 1.

| | Parts |
|---|---|
| Soybean protein | 100 |
| Propionaldehyde | 100 |
| Water | 200 |
| Sodium hydroxide | 0.4 |

The powder and plastic of the propionaldehyde-protein were colored pink to scarlet, the shade was lighter than those of Examples 3, 4 or 5 and the plastic was more transparent.

Example 7.—100 parts of soybean protein was swelled with 100 parts of water. To this was added a solution containing 10 parts chromium sulfate, 125 parts hot water and 2 parts concentrated hydrochloric acid. After digesting 24 hours, the acid was neutralized with sodium bicarbonate, the hardened protein filtered off and dried to about 10 percent moisture. A dark green thermoplastic resulted when pressed at 100° C. and 5000 pounds per square inch pressure.

Example 8.—100 parts of soybean protein was treated with 300 parts water and 10 parts of aluminum sulfate and digested for 24 hours, filtered and air dried. A thermoplastic was obtained when pressed at 130° C. and 5000 pounds per square inch pressure.

Example 9.—100 parts of lactic acid casein was treated with 20 parts crotonaldehyde and 200 parts water. After digesting 24 hours, the hardened protein was filtered off and air dried. A thermoplastic was obtained when pressed at 130° C. and 5000 pounds per square inch pressure.

The above examples are merely illustrative of various means of carrying out our invention, which may be varied widely without departing from the spirit thereof. The small amount of caustic included in every example where the hardening is done by an aldehyde, is given for reasons already stated, but it is to be understood it is not essential, and may be dispensed with. In the foregoing examples, we have given but three types of hardening agents, aldehydes, chromium salts, and aluminum salts.

We also recognize the fact that it is possible to increase the final plasticity and decrease the water absorption of the plastic by the incorporation of plasticizers, oils, waxes, fatty acids, or salts of fatty acids, as outlined above. These may be merely mixed with the molding powder with which they are compatible, or some sort of side reaction may be effected.

Our invention provides a simple and economical process whereby thermoplastic protein material may be produced. This material molds readily and comes finished as regards stability, finish, etc., from the die. It is completely thermoplastic so any fins or rejects may be returned to the die and remolded.

As many apparently widely different embodiments of our invention may be made without departing from the spirit and scope thereof, it is to be understood that our invention is not limited to the specific embodiments thereof, except as defined in the appended claims.

Having thus described our invention, what we claim for Letters Patent is:

We claim:

1. An article of manufacture, a thermoplastic protein moldable powder, which consists entirely and exclusively in the reaction product within the pH range of 7.0 to the isoelectric point of a globular protein with an aliphatic aldehyde of not over four carbon atoms, air dried to 10-12 percent moisture content.

2. An article of manufacture, a thermoplastic protein moldable powder, which consists entirely and exclusively in the reaction product within the pH range of 7.0 to the isoelectric point of a globular protein with formaldehyde, air dried to 10-12 percent moisture content.

3. An article of manufacture, a thermoplastic protein moldable powder, which consists entirely and exclusively in the reaction product at a pH of 7.0 to $4.1 \pm 0.2$ of soybean protein with an aliphatic aldehyde of not over four carbon atoms, air dried to 10-12 percent moisture content.

4. An article of manufacture, a thermoplastic protein moldable powder, which consists entirely and exclusively in the reaction product at a pH of 7.0 to $4.6 \pm 0.2$ of milk casein with an aliphatic aldehyde of not over four carbon atoms, air dried to 10-12 percent moisture content.

5. An article of manufacture, a thermoplastic protein moldable powder, which consists entirely and exclusively in the reaction product at a pH of 7.0 to $4.1 \pm 0.2$ of soybean protein with formaldehyde, air dried to 10-12 percent moisture content.

6. An article of manufacture, a thermoplastic protein moldable powder, which consists entirely and exclusively in the reaction product at a pH of 7.0 to $4.6 \pm 0.2$ of milk casein with formaldehyde, air dried to 10-12 percent moisture content.

GEORGE H. BROTHER.
LEONARD L. McKINNEY.